United States Patent Office 2,739,541
Patented Mar. 27, 1956

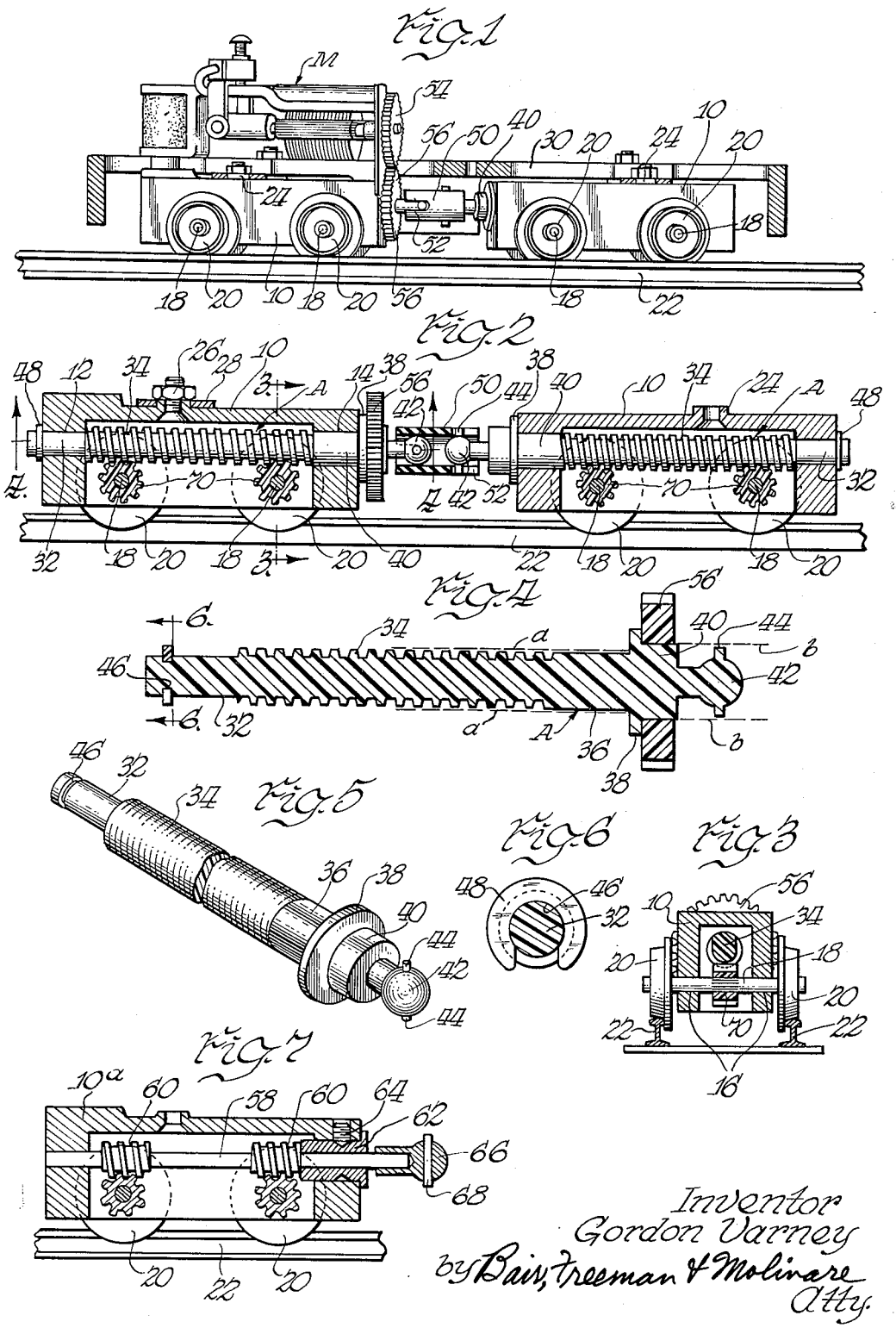

2,739,541

POWER TRUCK FOR MINIATURE ELECTRIC TRAINS

Gordon Varney, Coral Gables, Fla.

Application January 19, 1953, Serial No. 331,933

9 Claims. (Cl. 105—119)

This invention relates to a power truck for miniature electric trains and particularly to one that has a very inexpensive worm shaft for cooperation with worm gears on the drive wheel shafts of the truck frame.

One object of the invention is to provide an inexpensive worm shaft that can be molded of nylon or similar plastic material and which comprises a single unit which has a plurality of sections each performing a definite function in the assembled power truck, all of the sections being formed in one piece and eliminating the necessity of assembling several pieces together as heretofore practiced, the cost of producing the new worm shaft being less than 8% that of the cost of producing the prior arrangement.

Another object is to provide a worm shaft which can be molded with a pair of integral bearing sections in addition to the worm section, a flange section, an enlarged hub section on which a drive gear may be pressed and a ball head section for a universal joint connection including projections on opposite sides of the ball head, each of which sections and parts were heretofore manufactured separately and assembled together to produce the final worm shaft unit for mounting in the power truck.

Still another object is to provide my new worm shaft with a novel bearing arrangement that permits rotation of a pair of bearing sections thereof in the fore and aft openings of a truck frame with a worm section intermediate the bearing sections for meshing with worm gears on drive wheel shafts which extend transversely of the truck frame.

A further object is to provide the novel bearing arrangement referred to designed to eliminate certain parts heretofore used and provided with a groove at one end to receive a keeper that can be sprung into position to hold the shaft against end play in one direction, the flange of the shaft holding it against end play in the other direction.

With these and other objects in view, my invention consists in the construction, arrangement and combination of the various parts of my power truck for miniature electric trains, whereby the objects contemplated are attained, as hereinafter more fully set forth, pointed out in my claims and illustrated in the accompanying drawings, wherein:

Figure 1 is a side elevation of a pair of trucks for a miniature electric train and shows an electric motor mounted on one of them, the trucks being shown in side elevation and the frame connecting them in section, the trucks being operatively connected together by means of a universal drive shaft connection such as the one shown in my copending application, Serial No. 147,750, filed March 4, 1950, which matured into Patent No. 2,708,888 dated May 24, 1955.

Figure 2 is an enlarged vertical sectional view through the trucks and shows a pair of my improved worm shafts in elevation.

Figure 3 is a vertical sectional view on the line 3—3 of Figure 2.

Figure 4 is an enlarged sectional view on the line 4—4 of Figure 2 showing the worm shaft unit per se.

Figure 5 is a perspective view of the worm shaft, the worm section thereof being somewhat shortened to conserve space on the drawing.

Figure 6 is an enlarged sectional view on the line 6—6 of Figure 4 to show a keeper for the worm shaft; and Figure 7 is a sectional view similar to a portion of Figure 2 showing a prior construction.

On the accompanying drawing I have used the reference numeral 10 to indicate a truck frame. Two of the frames 10 are disclosed and they are provided with fore and aft openings for journalling my worm shaft unit which is designated generally by the reference character A. These openings are designated 12 and 14 and the opening 14 is larger than the opening 12 as illustrated in Figure 2.

The sides of the truck 10 are provided with openings 16 for journalling drive wheel shafts 18 on which are mounted drive wheels 20 to ride the rails 22. The truck frames 10 are provided with hubs 24 for pivot bolts 26 passing through cross plates 28 which cross plates support a connecting frame 30 on which the body of the locomotive or the like (not shown) is mounted. An electric motor M may be supported on one of the truck frames 10 for driving one of the worm shafts A as will hereinafter appear.

The worm shaft unit A consists of a plurality of sections in series with each other from left to right in Figure 4 which may be designated as a bearing section 32, a worm section 34, a bearing section 36, a flange section 38, an enlarged hub section 40 and a ball head section 42. The section 42 is provided with opposite projections 44 which are part of a universal drive shaft connection to be later described.

The bearing section 32 has a groove 46 therein to receive a C-shaped keeper 48. This keeper may be molded of plastic material such as nylon and the entire worm shaft including the sections 32, 36, 38, 40, 42 and 44 is also preferably molded of nylon. On the other hand it can be die-cast of metal if desired. The important feature of the invention is that it is molded in one piece so as to be produced inexpensively. Constructionally it has several advantages which will now be described.

The diameters of the bearing sections 32 and 36 and the worm section 34 are correlated so as to reduce the complications of assembly to a minimum. 34 and 36 are substantially the same diameter (which can be compared in Figure 4 with the reference lines a) so that the worm can pass through the opening 14 in the truck frame and the section 36 can then be journalled therein. The section 32, being smaller in diameter than the root diameter of the worm section, forms a portion which is journalled in the smaller opening 12. The flange section 38 may be dispensed with, or provided as disclosed so as to form a thrust bearing against the end of the truck frame when the truck is traveling in one direction, the keeper 48 taking the thrust when the truck is traveling in the opposite direction.

Two of the worm shaft units A may be used in adjacent truck frames as disclosed in Figure 2 and operatively connected together by a tube 50 of fiber or the like having slots 52 in its ends to receive the pin-like projections 44 of the ball head sections 42. The ball heads and the tube thereby serve as a universal joint connection between the two worm shafts so that all eight drive wheels 20 of the double truck arrangement may be powered from the motor M.

For this purpose the motor is provided with a gear 54 and this gear meshes with a gear 56 pressed on the enlarged hub section 40 as shown in Figure 4. The diameter of this hub is such that the internal diameter of the gear can pass over the ends of the projections 44 as indicated by the dotted lines *b* in Figure 4.

In manufacturing production, I find that the worm gear assembly A disclosed in Figure 4 may be molded at a cost of 3¢ each. On the other hand the prior procedure was to form these various parts of metal at a cost of 30.7¢ for material and 3.7¢ for the labor necessary to assemble the parts, which, together with an overhead of 125% made the cost of the metal worm shaft 39¢ as against 3¢ for the molded nylon shaft.

Figure 7 represents the prior construction wherein there is a shaft 58, two worms 60, a bearing bushing 62, a retainer set screw 64, a ball joint 66 and a cross pin 68. With respect to the labor required, the two worms have to be pressed on the shaft, the bearing bushing has to be placed on the shaft, the ball joint 66 has to be pressed on the shaft and drilled for the pin 68 and the pin has to be inserted and trimmed to size. This entire assembly then had to be inserted in the truck frame 10a and the set screw 64 installed—all of which represents the labor cost of 3.7¢. It is therefore obvious that I have produced a power truck which can be made much less expensively than heretofore by the use of the worm shaft unit A with its various sections molded integrally therewith thus eliminating the expensive prior parts 58 to 68 (which were usually of brass) and the labor required for the assembly thereof. Assembly of the unit A consists merely of inserting it in the truck frame 10 and slipping the retainer 48 in the groove 46 which obviously consumes but a small fraction of the time required for assembling the parts illustrated in Figure 7.

Nylon has been heretofore found to serve as an excellent bearing material where loads are not great. This is particularly true in such small power applications as miniature electric trains. The usual procedure is to provide nylon bearing sleeves but from the foregoing specification it will be obvious that I have reversed the procedure and instead used a nylon worm shaft with its bearing sections 32 and 36 to rotate in the metal of the truck frame 10 which is usually of die-cast material so as to be inexpensive yet provide a good bearing surface at 12 and 14. The worm section 34 may coact with the usual worm gears 70 pressed on the drive wheel shafts 18 as shown in Figure 3 and for simplicity in making the forming die, the worm may extend the full length from the section 32 to the section 36 as illustrated instead of being provided only at the worm gear locations.

The particular formation of the worm shaft unit A as disclosed also accommodates the drive gear 56 by permitting it to be pressed on the hub 40 which is of a diameter sufficient for the interior of the gear to clear the projections 44 when the gear is installed. The two different sizes of openings 12 and 14 are a novel arrangement to provide the required bearing surfaces for the bearing sections and at the same time permit the worm section 34 to pass through one of them during the assembly operation. This eliminates the use of a bearing bushing such as shown at 62 in Figure 7.

The completely molded ball 42 and projections 44 are a considerable improvement over the arrangement shown in Figure 7, particularly with respect to the assembly of the ball on the shaft, the necessity of drilling a hole for the pin 68 and the necessity of inserting and trimming the pin. All of this is eliminated with my construction wherein the molding A is ready for use as soon as it comes from the mold.

The keeper 48 eliminates the necessity of threading for the set screw 64 and also eliminates this screw together with the operation of inserting it. My construction, therefore, is a definite improvement over the prior procedure.

Some changes may be made in the construction and arrangement of the parts of my power truck for miniature electric trains, without departing from the real spirit and purpose of my invention, and it is my intention to cover by my claims any modified forms of structure or use of mechanical equivalents which may be reasonably included within their scope.

I claim as my invention:

1. In a power truck for miniature electric trains, a truck frame having fore and aft openings for journalling a worm shaft, one of said openings being larger than the other, a worm shaft having in series a bearing section for rotation in the smaller of said fore and aft openings, a worm section, a second bearing section for rotation in the larger of said fore and aft openings, and a ball head section provided with opposite projections, all of said sections being combined in a single integral unit which is molded from plastic material and said second bearing section being at least as large in diameter as the largest diameter of said worm section.

2. In a power truck of the character disclosed, a truck frame having a pair of openings for journalling a worm shaft, one of said openings being larger than the other, a worm shaft having in series a bearing section for rotation in the smaller of said openings, a worm section larger than said bearing section and smaller than the larger of said openings, a second bearing section fitting the other of said openings and being located therein for rotation relative thereto, and a ball head section provided with opposite projections, all of said sections being combined in a single integral unit.

3. In a power truck for miniature electric trains, a truck frame having fore and aft openings for journalling a worm shaft, one of said openings being larger than the other, a worm shaft unit having bearing sections formed as an integral part thereof for rotation in said openings, a worm section intermediate said bearing sections, a hub section enlarged relative to the larger of said openings, a ball head section provided with opposite projections, said enlarged hub section being greater in diameter than the diameter of said ball head across said projections, and a drive gear on said enlarged hub section.

4. In a power truck, a truck frame having fore and aft openings for journalling a worm shaft, one of said openings being larger than the other, a worm shaft having in series a bearing section for rotation in the smaller of said fore and aft openings, a worm section larger than said bearing section and smaller than the larger of said fore and aft openings, a second bearing section for fitting the other of said fore and aft openings for rotation therein, and a ball head section provided with opposite projections, all of said sections being molded from nylon and combined in a single integral unit.

5. In a power truck, a truck frame having fore and aft openings for journalling a worm shaft, one of said openings being larger than the other, a worm shaft having a bearing section for rotation in the smaller of said fore and aft openings, a groove therein for the reception of a keeper, a worm section larger than said bearing section and smaller than the larger of said fore and aft openings, a second bearing section for rotation in the other of said fore and aft openings, an enlarged hub section, and a ball head section provided with opposite projections, said enlarged hub section being greater in diameter than the diameter of said ball head across said projections, all of said sections being integrally combined in a single unit of molded construction.

6. In a power truck for miniature electric trains, a truck frame having a pair of openings for journalling a worm shaft, one of said openings being larger than the other, a worm shaft unit having in series a bearing section for rotation in the smaller of said openings, a groove therein for the reception of a keeper, a worm section larger than said bearing section and smaller than the larger of said openings, a second bearing section for rotation in the other of said openings, a flange section for engaging against the end of the truck frame adjacent the larger of said fore and aft openings, an enlarged hub section, and a ball head section provided with opposite projections.

7. In a power truck for miniature electric trains, a truck frame having a pair of openings for journalling a worm shaft, one of said openings being larger than the other, a worm shaft unit having in series a bearing section for rotation in the smaller of said openings, a worm section larger than said bearing section and smaller than the larger of said openings, a second bearing section for rotation in the other of said openings, a flange section for engaging against the end of the truck frame adjacent the larger of said fore and aft openings, an enlarged hub section, and a ball head section provided with opposite projections, said enlarged hub section being greater in diameter than the diameter of said ball head across said projections.

8. In a power truck for miniature electric trains, a truck frame having a pair of openings for journalling a worm shaft, one of said openings being larger than the other, a worm shaft unit having in series a bearing section for rotation in the smaller of said openings, a groove therein for the reception of a keeper, a worm section larger than said bearing section and smaller than the larger of said openings, a second bearing section for rotation in the other of said openings, an enlarged hub section, and a ball head section provided with opposite projections, said enlarged hub section being greater in diameter than the diameter of said ball head across said projections, all of said sections being combined in a single integral unit, said unit being molded from plastic material, and a gear pressed on said enlarged hub section.

9. In a power truck for miniature electric trains, a truck frame having a pair of openings for journalling a worm shaft, one of said openings being of larger diameter than the other, a worm shaft unit having in series a bearing section for rotation in the smaller of said openings, a worm section of larger diameter than said bearing section and of smaller diameter than the larger of said openings, a second bearing section for rotation in the other of said openings, said last section being at least as large in diameter as said worm section.

References Cited in the file of this patent

UNITED STATES PATENTS

| | | |
|---|---|---|
| 206,093 | Deschamps | July 16, 1878 |
| 1,437,637 | Dunkelberger | Dec. 5, 1922 |
| 2,263,711 | Walthers | Nov. 25, 1941 |
| 2,387,696 | Wildenheim | Oct. 23, 1945 |
| 2,558,180 | Johnson | June 26, 1951 |
| 2,595,936 | Goode | May 6, 1952 |